(12) United States Patent
Chakravarthy et al.

(10) Patent No.: US 7,694,164 B2
(45) Date of Patent: Apr. 6, 2010

(54) OPERATING SYSTEM-INDEPENDENT METHOD AND SYSTEM OF DETERMINING CPU UTILIZATION

(75) Inventors: Avinash P. Chakravarthy, Hillsboro, OR (US); Barnes Cooper, Beaverton, OR (US); Robert Gough, Cornelius, OR (US); John W. Horigan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1293 days.

(21) Appl. No.: 10/251,202

(22) Filed: Sep. 20, 2002

(65) Prior Publication Data

US 2004/0059956 A1 Mar. 25, 2004

(51) Int. Cl.
    *G06F 1/04* (2006.01)
(52) U.S. Cl. .................................... 713/501
(58) Field of Classification Search ................. 713/501
    See application file for complete search history.

(56) References Cited

U.S. PATENT DOCUMENTS 5,021,679 A     6/1991   Fairbanks et al.
5,072,376 A *  12/1991   Ellsworth .................... 718/105
5,153,535 A    10/1992   Fairbanks et al.
5,307,003 A     4/1994   Fairbanks et al.
5,627,412 A     5/1997   Beard
5,752,011 A     5/1998   Thomas et al.
5,974,557 A    10/1999   Thomas et al.
6,018,759 A     1/2000   Doing et al.
6,216,235 B1    4/2001   Thomas et al.
6,487,668 B2   11/2002   Thomas et al.
6,609,211 B2 *  8/2003   Atkinson ..................... 713/323
6,711,526 B2 *  3/2004   Cooper ........................ 702/186
6,816,809 B2 * 11/2004   Circenis ..................... 702/178

FOREIGN PATENT DOCUMENTS

EP          0422945       4/1991

OTHER PUBLICATIONS

"Advanced Configuration and Power Interface Specification", Revision 2.0c, Jun. 30, 2004, Compaq/Intel/Microsoft/Phoenix/Toshiba, pp. 1-488.

* cited by examiner

*Primary Examiner*—Thomas Lee
*Assistant Examiner*—Eric Chang
(74) *Attorney, Agent, or Firm*—Blakely, Sokoloff, Taylor & Zafman LLP

(57) ABSTRACT

A method and device are provided to monitor clock control signals from a CPU core; and calculate a time period during a sampling interval that the CPU core was used to perform work based on the clock control signals.

25 Claims, 6 Drawing Sheets

OPERATING SYSTEM-INDEPENDENT METHOD AND SYSTEM OF DETERMINING CPU UTILIZATION

FIELD OF THE INVENTION

The field of the invention relates generally to central processing units (CPUs). More particularly the field invention relates to determining CPU utilization. Still more particularly, the field of the invention relates to an operating system-independent method and system of determining utilization of a CPU within a data processing system.

BACKGROUND

In most modern multi-programmed data processing or computer systems, various tasks or user applications contend for processing time to execute on a central processing unit (CPU) or similar processing device. Activity in even the most highly multi-tasking environment tends to be bursty, having periods of latency or inactivity followed by periods of intense processing activity. Accordingly, it is useful to analyze the utilization of CPUs and other similar data processing system devices for a variety of reasons. For example, high processor utilization during periods in which few or no user tasks are scheduled may be an indicia of a virus program or of some correctable fault in task scheduling resulting in thrashing or other inefficient system behavior. In theory, CPU utilization may be determined by accumulating CPU idle time across a sampling interval to determine the percentage of time the processor is inactive. To accomplish this, a list of tasks or threads is maintained by the OS which are ready-to-run, i.e., not waiting for some event to resume execution. When this ready-to-run list is empty, no tasks are being executed and the processor is idle. Accordingly, a CPU-independent timer is read and the processor is essentially deactivated. This is accomplished by putting the processor in a predefined processor performance state such as the C2 or C3 states defined by the well known Advanced Configuration and Power Interface Specification, Revision 2.0, Jul. 27, 2000 (ACPI). In the C2 state clock signals are removed from the functional units of the processor while its memory subsystem remains active and "snoopable" by other devices. In a C3 state, the clock signal is also removed from this memory portion of the data processing system and a so-called "deep sleep" state is entered. When a new task is added to the ready-to-run list, the processor is placed in an active state (such as the C0 ACPI state) and the timer is read again. The difference between the first and second timer reads (multiplied by the timer's period) then represents the CPU's idle time. The accumulation of this time across a sampling interval is then used to determine the CPU utilization (what percentage of the CPU's time is spent idle). Unfortunately, this measure of CPU utilization is difficult to calculate outside of the OS through a supported application programming interface (API). This is because the API is generally unaware of the ready-to-run task list which is known only to the OS.

DETAILED DESCRIPTION

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various terms peculiar to nomenclature used by Intel Corporation of Santa Clara, Calif., will be used to describe signals and architectural components. The use of these terms are intended to be by way of example only and is thus non-limiting.

An operating system-independent method and system of determining utilization of a CPU within a data processing system is disclosed. More particularly, in accordance with one embodiment of the invention, a method for determining CPU utilization is provided which includes monitoring clock signals from a CPU core; and calculating a time period during a sampling interval that the CPU core was used to perform work based on the clock control signals.

In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figure 1A:
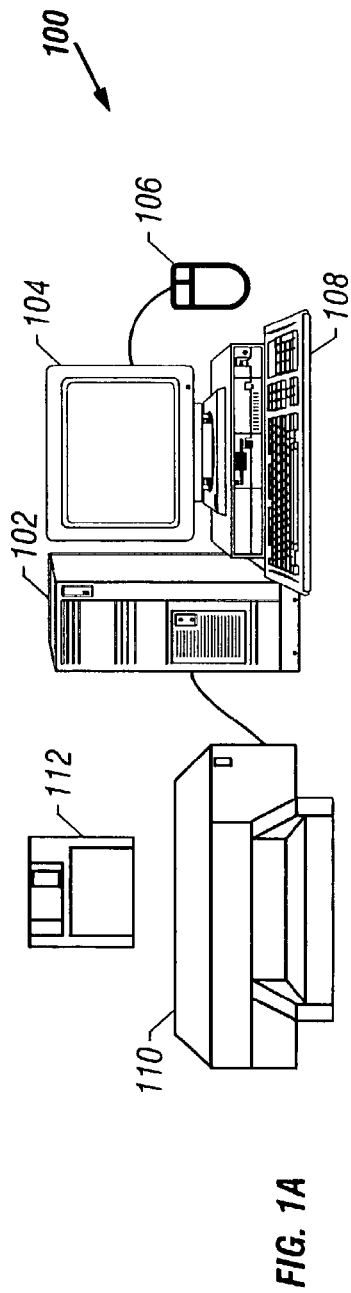
FIG. 1A illustrates a conventional data processing system usable with the present invention.

Referring now to FIG. 1a, a conventional data processing system 100 useable with the present invention is illustrated. Data processing or computer system 100 is comprised of a system unit 102, output devices such as display 104 and printer 110, and input devices such as keyboard 108, and mouse 106. Data processing system 100 receives data for processing by the manipulation of input devices 108 and 106 or directly from fixed or removable media storage devices such as disk 112 and network connection interfaces (not shown). Data processing system 100 then processes data and presents resulting output data via output devices such as display 104, printer 110, fixed or removable media storage devices like disk 112 or network connection interfaces.

Figure 1B:
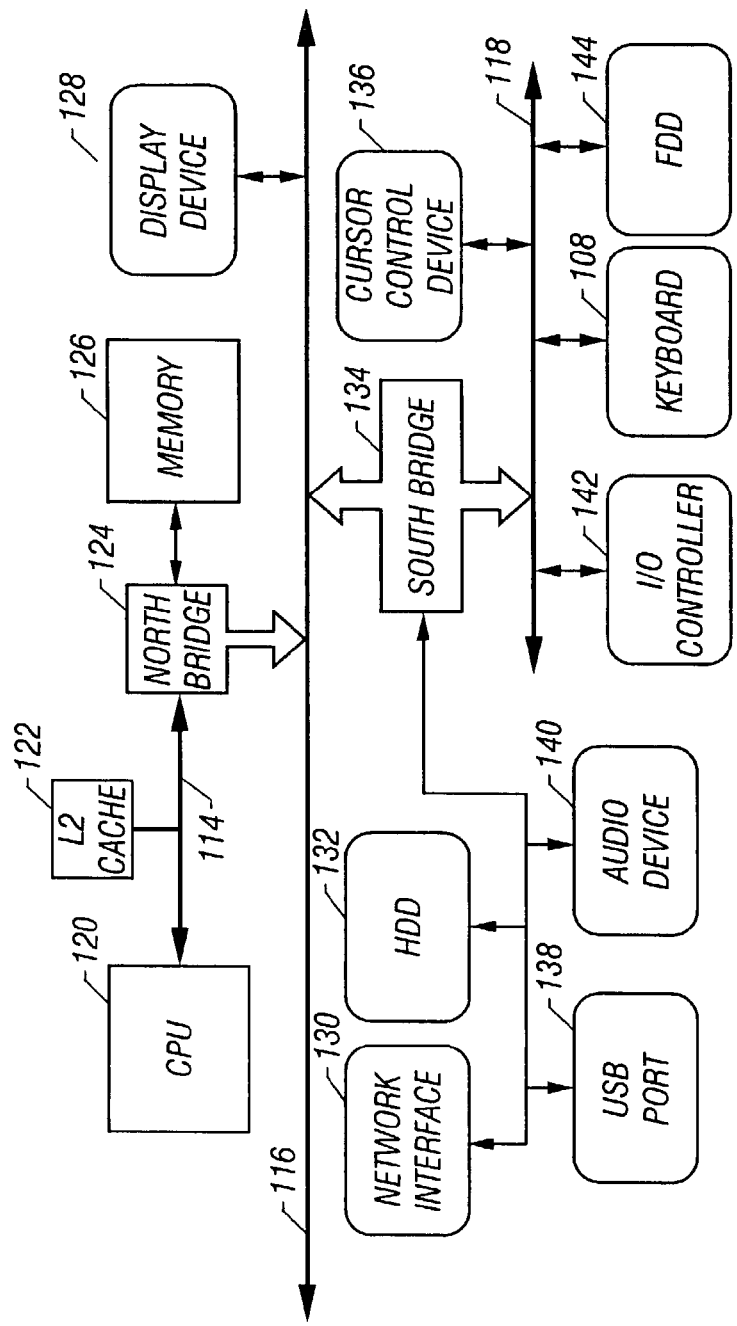
FIG. 1B illustrates a prior art architecture of the data processing system depicted in FIG. 1A.

Referring now to FIG. 1b, there is depicted a high-level block diagram of the components of a data processing system 100 such as that illustrated by FIG. 1a. In a conventional computer system, system unit 102 includes a processing device such as central processing unit (CPU) 120 connected to a level two (L2) cache 122 over a processor system bus (PSB) 114. Processor system bus (PSB) 114 is in turn coupled to an expansion bus such as local bus 116 and a memory 126 via a north bridge circuit 124. Local bus 116 may include a peripheral component interconnect (PCI), Video Electronics Standards Association (VESA) bus or the like, tightly coupled to the processor 120 and the processor system bus 114 to permit high-speed access to select devices such as display device 128.

Memory 126 may include read-only (ROM) and/or random access (RAM) memory devices such as a synchronous dynamic random access memory (SDRAM) module capable of storing data as well as instructions to be executed by CPU 120. Access to data and instructions stored within memory 126 is provided via a memory controller (not shown) within north bridge circuit 124. L2 cache 122 is similarly used, typically in a hierarchical manner, to store data and instructions for direct access by CPU 120. Display device 128 may include a cathode ray tube (CRT) display such as display 104, liquid crystal display (LCD), or a similar device for displaying various kinds of data to a computer user. For example, image, graphical, or textual information may be presented to the user on display device 128. System unit 102 of data processing system 100 also features an expansion or "compatibility" bus 118 such as the Industry Standard Architecture (ISA) bus, and a south bridge circuit 134 coupling it to local bus 116 to facilitate the attachment of other, relatively slower devices to the system 100. South bridge circuit 134 includes a universal serial bus (USB) port 138 as well as other direct connections for devices such as a network interface card 130, a data storage device, such as a magnetic hard disk drive 132, and an audio device 140 such as a speaker or sound card.

Other devices not directly coupled to south bridge 134 may be connected to the system 100 via the expansion bus 118 as illustrated. A floppy disk drive (FDD) 144 providing additional data storage capacity on removable media storage devices such as disk 112, and input devices such as a keyboard 108 and a cursor control device 136 are each coupled to expansion bus 118 in this manner to communicate data, instructions, and/or command selections to central processing unit 120. Cursor control device 136 may comprise a conventional mouse such as mouse 106 of FIG. 1a, a trackball, or any other device capable of conveying desired cursor manipulation. Similarly, expansion bus 118 includes an input/output (I/O) controller having standard serial and parallel port functionality for connecting other I/O devices such as printer 110 to the system.

The system of the present invention includes software, information processing hardware, and various processing steps, which will be described below. The features and process steps of the present invention may be embodied in machine or computer executable instructions embodied within media such as disk 112. The instructions can be used to cause a general purpose or special purpose processor such as CPU 120, which is programmed with the instructions to perform the described methods of the present invention. Alternatively, the features or steps of the present invention may be performed by specific hardware components that contain hard-wired logic for performing the steps, or by any combination of programmed computer components and custom hardware components.

Figure 2:
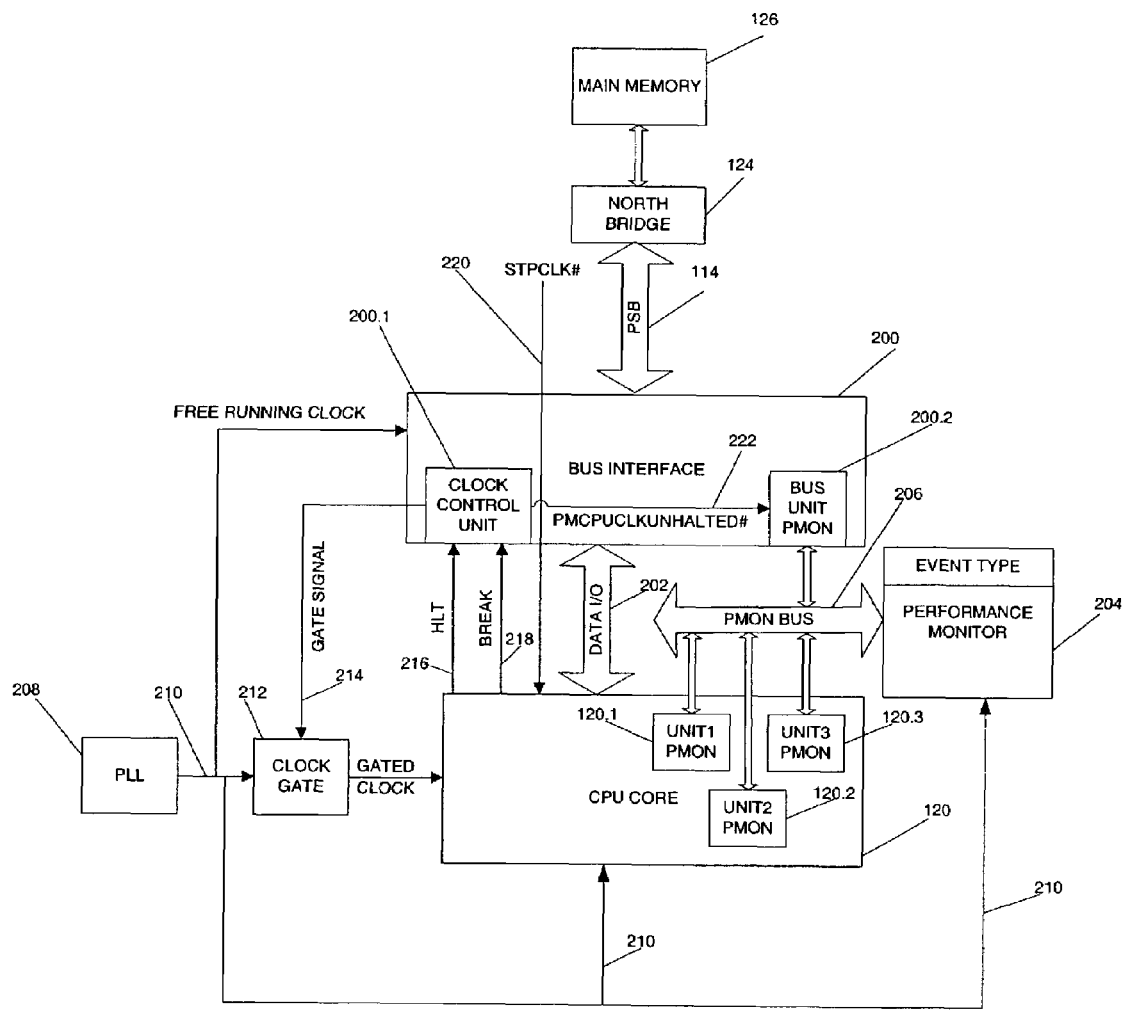
FIG. 2 illustrates a portion of the architecture depicted in FIG. 1B in greater detail.

FIG. 2 shows a portion of the architecture depicted in FIG. 1 in greater detail in order to illustrate how monitoring clock control signals in the CPU core is achieved in accordance with one embodiment of the invention.

Referring to FIG. 2, the CPU core 120, north bridge circuit 124 and main memory 126 are as shown in FIG. 1B of the drawings. Communications between CPU core 120 and north bridge circuit 124 occurs via a data pathway which includes processor system bus (PSB) 114, a bus interface 200 and a data input/output (I/O) bus 202.

The bus interface 200 includes a clock control unit 200.1 and a bus performance monitoring (PMON) unit 200.2. The functions of the clock control unit 200.1 and the bus PMON unit 200.2 in the context of the present invention will be explained below.

The architecture shown in FIG. 2 includes a number of configurable performance monitors 204 (only one of which has been shown) which can be configured to monitor various performance related aspects of CPU core 120. The performance monitor 204 includes an on die register (not shown) that can be accessed via a high privilege or ring 0 application. The performance monitor 204 communicates with bus PMON unit 200.2 and various other PMON units 120.1 to 120.3 within CPU core 120 via a performance monitoring bus 206.

In accordance with the present invention, the performance monitor 204 is configured to monitor an event type known as CPU_CLKS_UNHALTED. This allows the performance monitor 204 to monitor clock control signals from CPU core 120 as described in greater detail below. A clock signal 210 is generated by a phase locked loop (PLL) 208 and fed to CPU core 120 via a clock gate 212. The purpose of the clock gate 212 is to gate off or de-assert clock signal 210 whenever clock control unit 200.1 generates a gate signal 214. The clock signal is also fed directly to CPU core 120. Most of the components with CPU core 120 use the gate signal 214. However, some components use the clock signal 210.

The generation of the gate signal 214 by clock control unit 200.1 is controlled by CPU core 120 which sends halt (HLT) signals 216 and break (BREAK) signals 218 to clock control unit 200.1. CPU core 120 sends HLT signals 216 in order to turn off clocking to one of its functional units. If bus interface 200 is busy then HLT signals 216 are ignored, otherwise clock control unit 200.1 sends gate signal 214 to gate clock signal 210. CPU 120 asserts BREAK signals 218 when clock signal 210 is to be ungated. Bus interface 200 may ungate clock signal 210 due to PSB 114 activity even when break signal 218 is not asserted. In this case, CPU core 120 continues to send HLT signals 216 until the PSB 114 activity subsides.

Halt signals 216 may be generated either directly by software (microcode) or indirectly (by sleeping thread counters). Motherboard logic (not shown) can generate a stop clock (STPCLK#) 220 signal which passes through bus interface 200 with minimal processing. Bus interface 200 is responsible for synchronizing STPCLK# signal 220 to clock signal 210 which represents a free-running or system clock.

There may be a number of different reasons why CPU core 120 asserts HLT signal 216. These reasons include execution of an Auto Halt instruction, a STPCLK# assertion, internal faults, etc. Events that cause BREAK signal 218 to be asserted include STPCLK# de-assertion, external interrupts, resets, etc.

Clock control unit 200.1 uses HLT signal 216 and BREAK signal 218 generated during a clock cycle of the clock signal 210 to generate a signal 222 known as PMCPUCLKUNHALTED#. This signal is fed to bus PMON unit 200.2.

In accordance with the techniques of the present invention, a high privilege application in the form of a ring 0 driver is used to configure performance monitor 204 to monitor an event known as CPU_CLKS_UNHALTED. Whenever the CPU_CLK_UNHALTED event selection is detected bus PMON unit 200.2 drives the PMCPUCLKUNHALTED# signal 222 onto PMON bus 206. This causes a register of performance monitor 204 to increment on each core clock that assertion of the PMCPUCLKUNHALTED# signal 222 is detected.

Thus, in effect, performance monitor 204 serves as a counter which measures a length of time (or ticks) for which CPU core 120 has requested clock control unit 200.1 to allow clock signal 210 to be asserted. Since when clock signal 210 is de-asserted, CPU core 120 is not performing work (i.e. CPU 120 is not executing application code), measuring a length of time that the PMCPUCLKUNHALTED# signal 222 is asserted gives an indication of a length of time in a cycle of the system clock during which CPU core 120 actually performed work.

Embodiments of the present invention include a utilization application that includes the high privilege or a ring 0 driver to configure and read performance monitor 204 during a time sampling interval as described above. In addition, the utilization application includes a low privilege or ring 3 application which calculates a utilization for CPU core 120 using the ring 0 driver to control performance monitor 204 to monitor the PMCPUCLKUNHALTED# signal 222.

Figure 3:
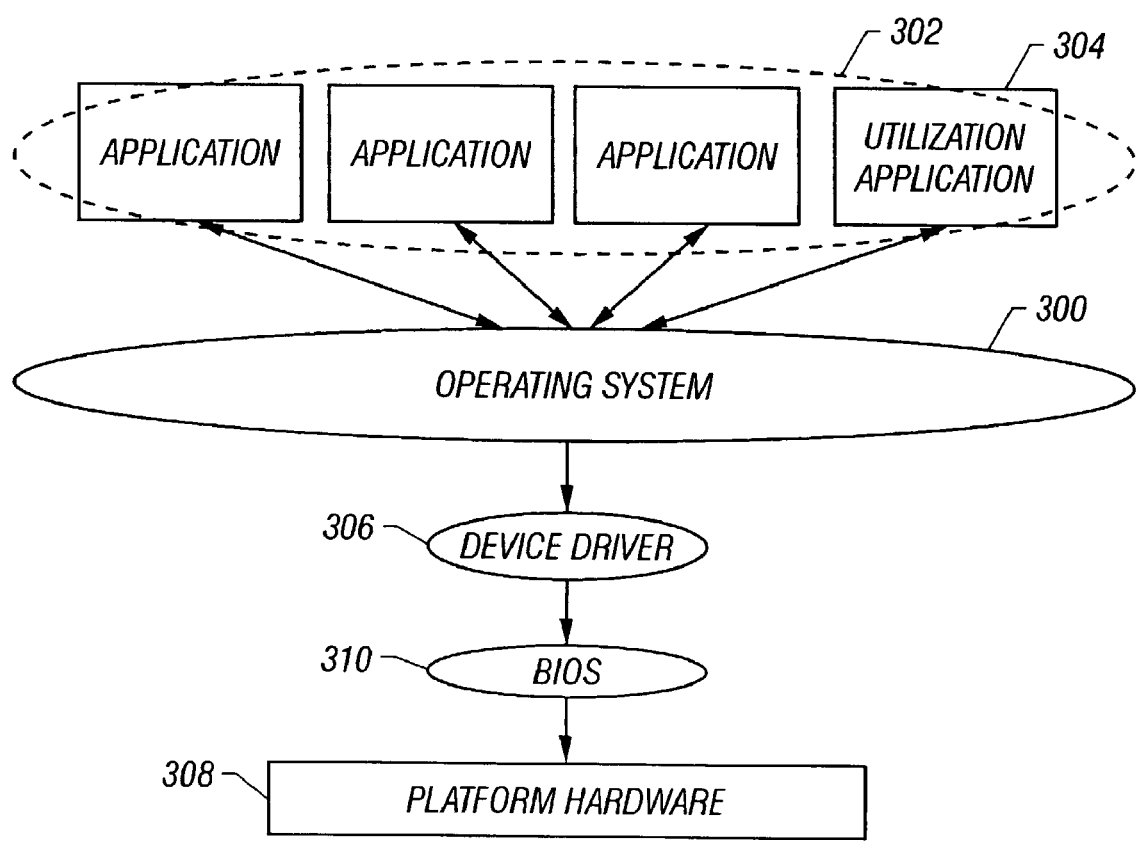
FIG. 3 illustrates an architectural system diagram depicting the operation of a data processing system according to one embodiment of the present invention.

Referring now to FIG. 3, an architectural system diagram depicting the operation of a data processing system according to the present invention is illustrated. In the illustrated embodiment, a plurality of application programs 302 such as CPU utilization application 304 interact with various platform hardware devices 308 including a CPU 120 via an operating system 300 such as the Windows™ operating system from Microsoft Corporation, one or more device drivers 306, and basic input/output system (BIOS) code 310. The illustrated system is interrupt-driven both with respect to the multitasking of the various applications 302 and communication between applications 302 and platform hardware 308.

Accordingly, in one embodiment of the present invention, an application 302 request for a hardware resource from within platform hardware 308 can cause an interrupt, such as a System Control Interrupt (SCI) or a System Management Interrupt (SMI) to be generated and an interrupt handler routine to be responsively executed. Interaction between operating system 300 and platform hardware 308 is then facilitated by a device driver 306 and BIOS 310. In the illustrated embodiment, BIOS 310 contains information such as physical device addresses of the various devices 308 attached to the data processing system 100 and is useful with respect to the actual transmission of data. By contrast, device driver 306 is typically specific to a particular hardware device and is usually concerned with the translation of data between various device formats.

The utilization application 304 is a periodically execution applet or application. Each time the applet is executed, a CPU utilization is calculated as described below.

As noted above, performance monitor 204 increments only when CPU core 120 is not in an idle state. Thus, in accordance with one embodiment of the present invention, the ring 0 driver application 306 starts and stops performance monitor 204 based on a power state of CPU 120 as illustrated in FIG. 4 of the drawings.

Figure 4:
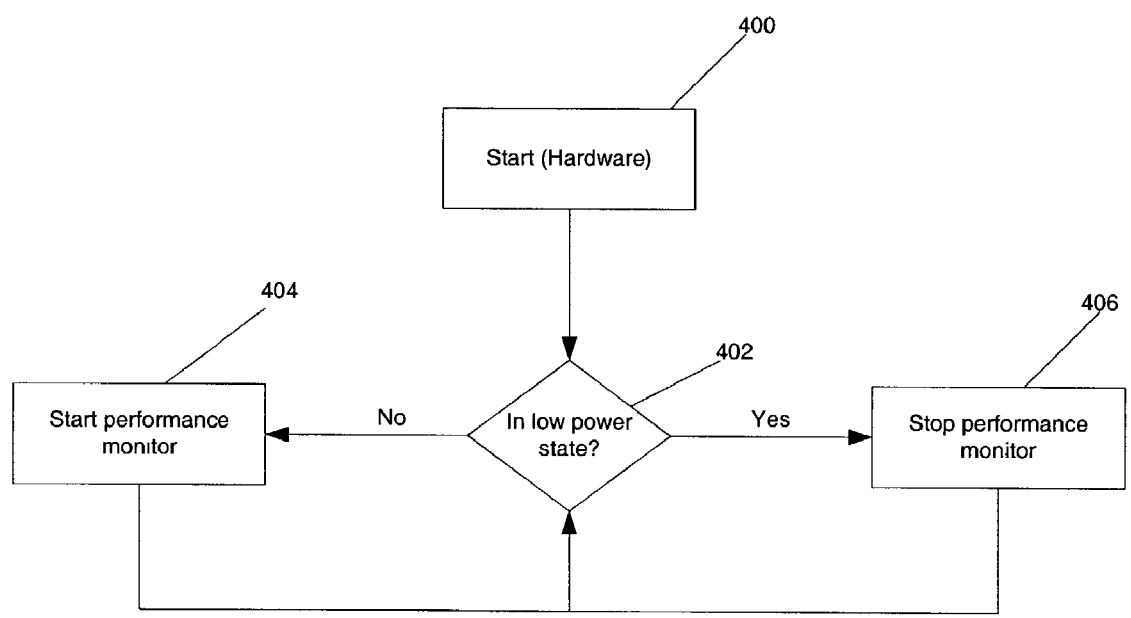
FIGS. 4 to 6 show flow charts of operations performed in accordance with embodiments of the present invention.

Referring to FIG. 4, at block 400 platform hardware 308 is initialized or started. At 402, hardware 308 determines if CPU 120 is in a low power state. If CPU 120 is not in a low power state then, at 404, performance monitor 204 is started. If at any stage during execution of the techniques of the present invention, hardware 308 determines that CPU 120 is in a low power state then performance monitor 204 is stopped, at block 406.

Figure 5:
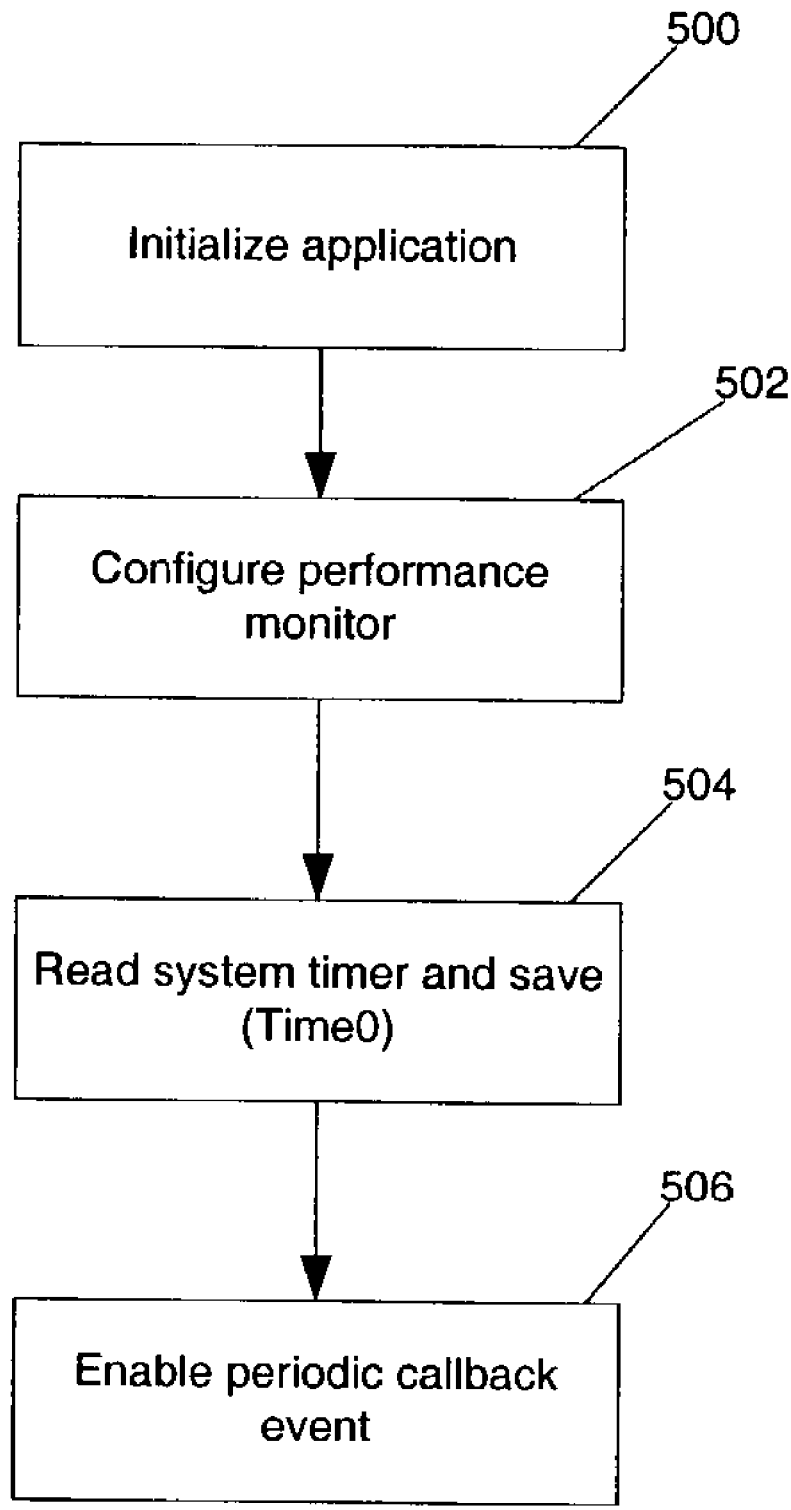

FIG. 5 of the drawings shows a flow chart of operations performed by the ring 3 component of utilization application 304.

Referring to FIG. 5, at block 500 the applet initializes. At block 502 performance monitor 204 is configured to monitor the CPU_CLKS_UNHALTED event. At block 504 a system timer is read and saved as a value called Time0.

At block 506 a periodic call back event is enabled. This allows the operation shown in FIG. 6 of the drawings to be executed periodically, for example every 300 milliseconds. Enabling periodic call back at block 506 may be implemented in a variety of manners including timer based interrupts, system management events, or operating system directed sleep requests that put a thread to sleep for discrete intervals of time.

Figure 6:
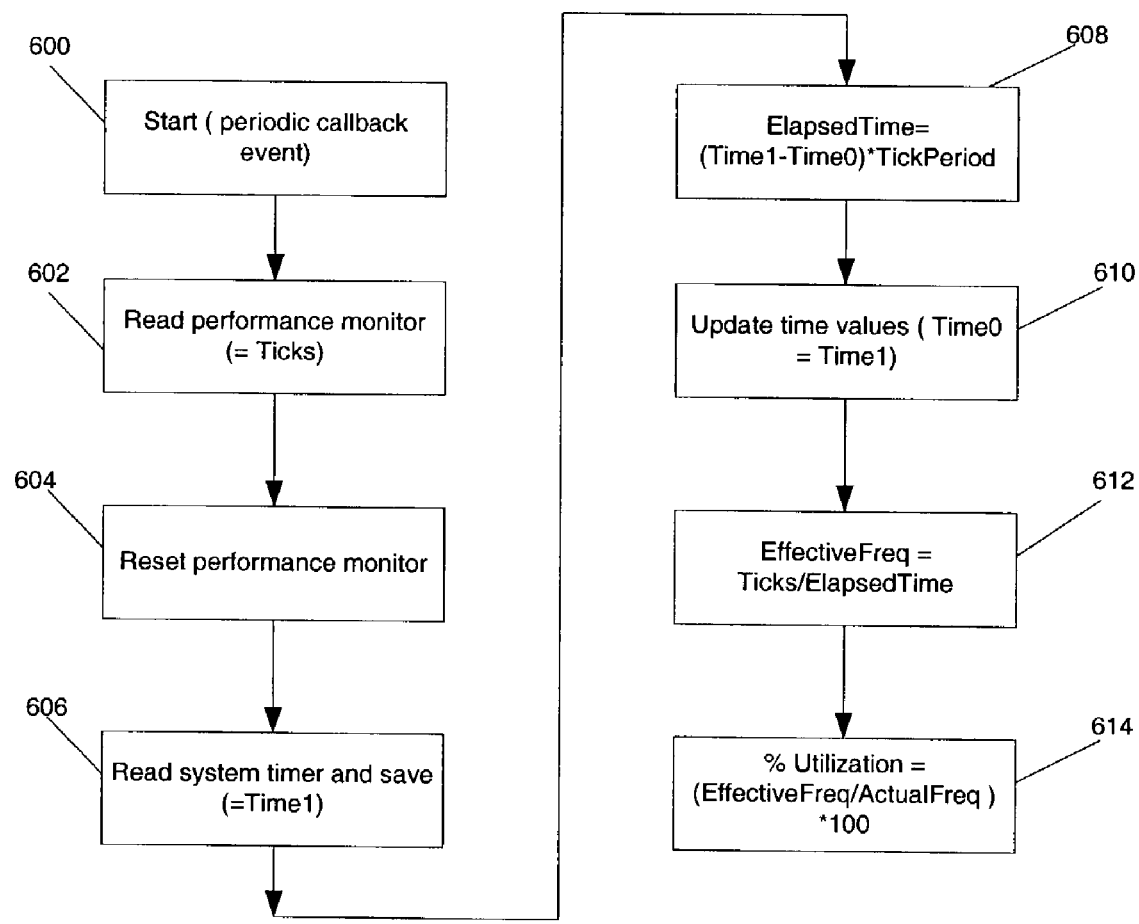

Referring now to FIG. 6 of the drawings, at block 600 the periodic call back event is started. At block 602, performance monitor 204 is read and its value is saved as a value known as "Ticks". At block 604, performance counter 204 is reset. This is done in order to prevent overflow. At block 606, the system timer is read and saved as "Time1". At block 608 an "ElapsedTime" is calculated wherein: ElapsedTime= (Time1−Time0)*TickPeriod, and wherein TickPeriod is the period between each tick of performance monitor 204.

At block 610 the time values are updated wherein Time1 is saved as Time0. This ensures that the calculated value for elapsed time is the actual time interval between successive readings of the system timer. At block 612 an effective frequency is calculated, wherein EffectiveFreq=Ticks/ElapsedTime. At block 614, a percentage utilization for CPU 120 is calculated wherein Percentage_Utilization=(EffectiveFreq/by Actual Frequency)×100.

Not all processors have an architecture such as the one now shown in FIG. 2 of the drawings. Thus, utilization applet 304, in one embodiment of the invention determines a type for a processor of a system on which it is running. If the type is of a predetermined type, then the technique described above for calculating CPU utilization is performed. The predetermined type includes the Pentium 4 family of microprocessors or a higher family and the Banias family of microprocessors. However, if it is determined that the processor is from a family of processors that is lower than the Pentium 4 family of processors, for example the Pentium 3 family of processors then the techniques for calculating CPU utilization described in copending U.S. patent application Ser. No. 09/750,676 are used to calculate CPU utilization.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
monitoring clock control signals from a CPU core; and
calculating a time period during a sampling interval that the CPU core has requested a clock control unit to allow clock signals to be asserted.

2. The method of claim 1, wherein the monitoring comprises receiving, in a clock control unit, halt and break signals from the CPU core that cause the clock control unit to respectively start and stop a clock signal to the CPU core; and generating a clock control unit signal based on the halt and break signals, the clock control unit signal indicating a number of times during the sampling interval that the clock signal to the CPU core was started.

3. The method of claim 2, wherein the monitoring further comprises sending the clock control unit signal to a performance monitoring unit in the bus interface, which performance monitoring unit is part of performance monitoring logic to monitor configurable events relating to CPU performance.

4. The method of claim 3, wherein the monitoring further comprises configuring the performance monitoring unit to drive the clock control unit signal onto a performance monitoring bus which facilitates communications between components of the performance monitoring logic.

5. The method of claim 4, wherein the monitoring further comprises configuring a register of the performance monitoring logic to increment when the performance monitoring bus unit drives the clock control unit signal onto the performance monitoring bus.

6. The method of claim 5, wherein the calculating comprises reading the register once in the sampling interval; and dividing the reading by the sampling interval to get an effective frequency for the CPU core.

7. The method of claim 6, further comprising resetting the register after each reading thereof.

8. The method of claim 2, wherein the clock control unit is integrated in a bus interface which bridges communications between a processor system bus and the CPU core.

9. A method comprising:
configuring a performance monitor to monitor an event indicating when a clock signal to a CPU core is stopped;
reading the performance monitor once during a sampling time interval to obtain a value; and
calculating an effective frequency of the CPU core by dividing the value by the sampling time interval.

10. The method of claim 9, wherein the event is an event known as CPU_CLKS_UNHALTED.

11. The method of claim 10 further comprising:
resetting the performance monitor after the reading; and
repeating the reading of the performance monitor once during the sampling time interval to obtain the value, and the calculating of the effective frequency of the CPU core by dividing the value by the sampling time interval, for each sampling time interval.

12. The method of claim 11, further comprising expressing the effective frequency as a percentage of an actual frequency for the CPU core.

13. A method comprising:
determining a type of a microprocessor operating in a system;
if the type is of a predefined type, then configuring a performance monitor to monitor an event indicating when a clock signal to a CPU is stopped;
reading the performance monitor once during a sampling time interval to obtain a value; and
calculating an effective frequency for the CPU core by dividing the value by the sampling time interval.

14. The method of claim 13, wherein the event is the event known as CPU_CLKS_UNHALTED.

15. The method of claim 14, wherein the reading of the performance monitor once during the sampling time interval to obtain the value, and the calculating of the effective frequency for the CPU core by dividing the value by the sampling time interval, are performed only if the CPU core is not in a low power state.

16. A tangible computer-readable medium having stored thereon a sequence of instructions which when executed by a processing system cause the system to perform a method comprising:
monitoring clock control signals from a CPU core; and
calculating a time period during a sampling interval that the CPU core has requested a clock control unit to allow clock signals to be asserted.

17. The computer-readable medium of claim 16, wherein the monitoring comprises receiving, in a clock control unit, halt and break signals from the CPU core that cause the clock control unit to respectively stop and start a clock signal to the CPU core; and generating a clock control signal based on the halt and break signals, the clock control unit signal indicating a number of times during the sampling interval that the clock signals to the CPU core was started.

18. The computer-readable medium of claim 17, wherein the monitoring further comprises sending the clock control unit signal to a performance monitoring unit in the bus interface, which performance monitoring unit is part of performance monitoring logic to monitor configurable events relating to CPU performance.

19. The computer-readable medium of claim 18, wherein the monitoring further comprises configuring the performance monitoring unit to drive the clock control unit signal onto a performance monitoring bus which facilitates communications between components of the performance monitoring logic.

20. The computer-readable medium of claim 17, wherein the clock control unit is integrated in a bus interface which bridges communications between a processor system bus and the CPU core.

21. A tangible computer-readable medium having stored thereon a sequence of instructions which when executed by a processing system, cause the system to perform a method comprising:
configuring a performance monitor to monitor an event indicating when a clock signal to a CPU core is de-asserted;
reading the performance monitor once during a sampling time interval to obtain a value; and
calculating an effective frequency of the CPU core by dividing the value by the sampling time interval.

22. The computer-readable medium of claim 21, wherein the event is an event known as CPU_CLKS_UNHALTED.

23. A computer-readable medium having stored thereon a sequence of instructions which when executed by a processing system cause a system to perform a method comprising:
determining a type of a microprocessor operating in a system;
if the type is of a predefined type, then configuring a performance monitor to monitor and event indicating that a clock signal to a CPU is stopped;
reading the performance monitor once during a sampling time interval to obtain a value; and
calculating an effective frequency for the CPU core by dividing the value by the time sampling interval.

24. The computer-readable medium of claim 23, wherein the event is the event known as CPU_CLKS_UNHALTED.

25. The computer-readable medium of claim 23, wherein the configuring of the performance monitor to monitor the event indicating when the clock signal to the CPU core is de-asserted, and the reading of the performance monitor once during the sampling time interval to obtain the value, are performed only if the CPU core is not in a low power state.

* * * * *